United States Patent
Jones

(10) Patent No.: US 10,439,293 B2
(45) Date of Patent: Oct. 8, 2019

(54) ANTENNA SYSTEMS USING AIRCRAFT PROPELLERS

(71) Applicant: Lockheed Martin Corporation, Bethesda, MD (US)

(72) Inventor: Mike I. Jones, Azle, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 352 days.

(21) Appl. No.: 15/463,167

(22) Filed: Mar. 20, 2017

(65) Prior Publication Data

US 2018/0269587 A1  Sep. 20, 2018

(51) Int. Cl.
| | |
|---|---|
| H01Q 15/14 | (2006.01) |
| H01Q 15/16 | (2006.01) |
| H01Q 1/44 | (2006.01) |
| H01Q 1/28 | (2006.01) |
| B64C 11/00 | (2006.01) |
| B64C 1/36 | (2006.01) |
| B64C 11/20 | (2006.01) |
| B64C 39/02 | (2006.01) |
| G01S 13/00 | (2006.01) |

(52) U.S. Cl.
CPC ............... *H01Q 15/14* (2013.01); *B64C 1/36* (2013.01); *B64C 11/00* (2013.01); *B64C 11/20* (2013.01); *B64C 39/024* (2013.01); *H01Q 1/28* (2013.01); *H01Q 1/44* (2013.01); *H01Q 15/165* (2013.01); *B64C 2201/162* (2013.01)

(58) Field of Classification Search
USPC .................................................. 343/705, 708
See application file for complete search history.

(56) References Cited

U.S. PATENT DOCUMENTS

| | | | |
|---|---|---|---|
| 2,490,330 A | 12/1949 | Wilde, Jr. | |
| 2,495,748 A | 1/1950 | Matson | |
| 3,389,393 A | 6/1968 | Young, Jr. | |
| 3,478,353 A | 11/1969 | Adams, Jr. | |
| 3,550,130 A | 12/1970 | Shaw | |
| 3,611,376 A | 10/1971 | Gutleber | |
| 3,855,591 A * | 12/1974 | Young | G01S 13/913 342/179 |
| 3,896,446 A | 7/1975 | Kondoh et al. | |
| 4,638,315 A * | 1/1987 | Raven | G01S 13/9035 342/25 F |

(Continued)

FOREIGN PATENT DOCUMENTS

| | | |
|---|---|---|
| CA | 2101903 A1 | 5/1994 |
| WO | WO2000-13040 | 3/2000 |
| WO | WO2016-148496 A1 | 9/2016 |

OTHER PUBLICATIONS

European Patent Office, Germany, Extended European Search Report regarding Application No. 18162746.4-1010, dated May 8, 2018.

(Continued)

*Primary Examiner* — Bernarr E Gregory
(74) *Attorney, Agent, or Firm* — Baker Botts L.L.P.

(57) ABSTRACT

In one embodiment, a system includes an aircraft body and a propeller coupled to the aircraft body. The propeller includes a plurality of blades forming a rearward-facing curvature with respect to an axis running longitudinally with the aircraft body. The system further includes a surface coupled to a first blade of the propeller that is operable to reflect radio frequency (RF) waves.

20 Claims, 1 Drawing Sheet

(56) References Cited

U.S. PATENT DOCUMENTS

| | | | | |
|---|---|---|---|---|
| 4,737,788 A | * | 4/1988 | Kennedy | G01S 13/50 |
| | | | | 342/159 |
| 5,614,908 A | | 3/1997 | Phelan et al. | |
| 5,745,081 A | | 4/1998 | Brown et al. | |
| 6,054,947 A | * | 4/2000 | Kosowsky | G01S 13/89 |
| | | | | 342/191 |
| 7,701,384 B2 | | 4/2010 | Becker et al. | |
| 7,728,756 B2 | * | 6/2010 | Krikorian | G01S 13/9035 |
| | | | | 342/25 A |
| 8,957,816 B2 | | 2/2015 | Imbert et al. | |
| 8,992,181 B2 | * | 3/2015 | Fixter | F03D 1/065 |
| | | | | 416/223 R |
| 9,404,371 B1 | * | 8/2016 | McDonald | F01D 5/147 |
| 2010/0328169 A1 | | 12/2010 | Collette et al. | |
| 2013/0272875 A1 | | 10/2013 | Sieber et al. | |

OTHER PUBLICATIONS

EPO Communication pursuant to Article 94(3) EPC regarding Patent Application No. 18 162 76.4-1010.

\* cited by examiner

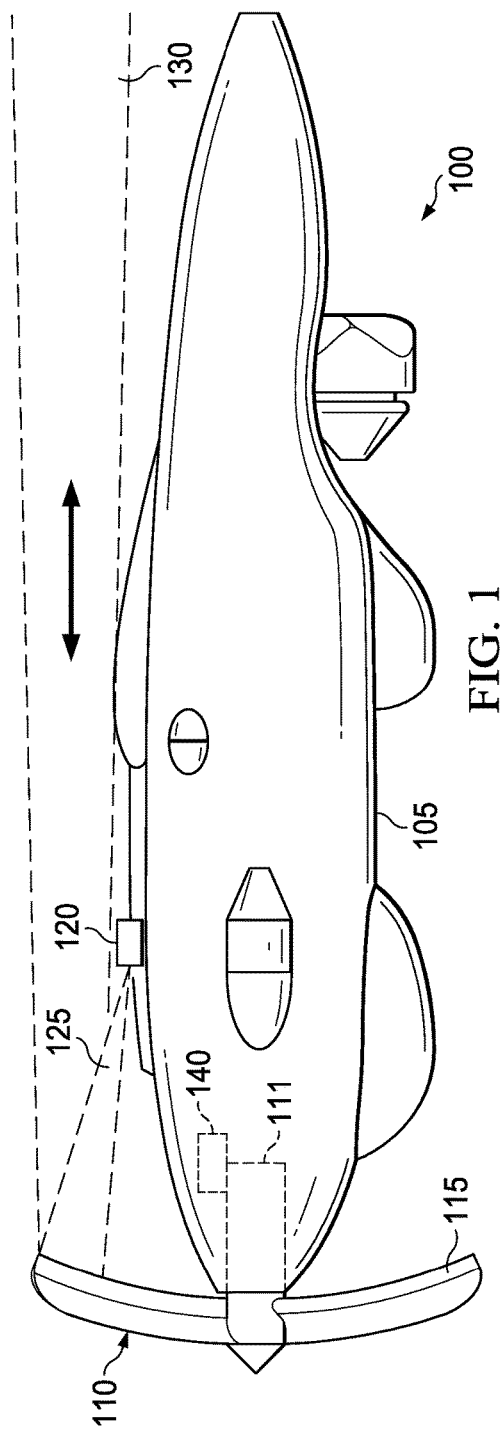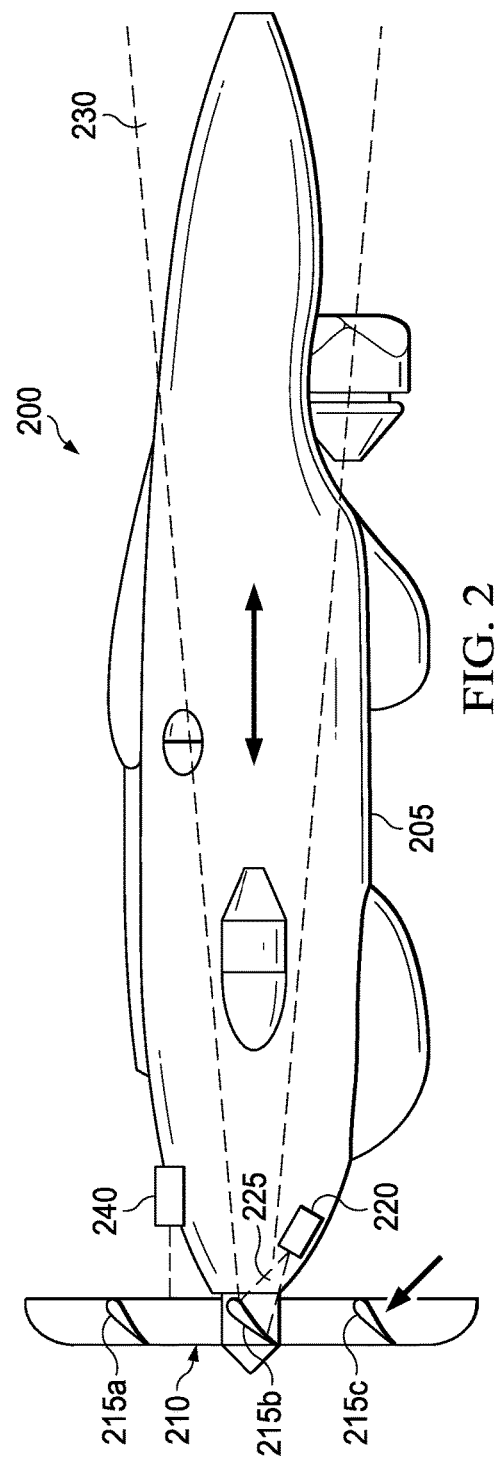

ANTENNA SYSTEMS USING AIRCRAFT PROPELLERS

TECHNICAL FIELD

This disclosure generally relates to aircraft antenna systems and more specifically to using aircraft propeller blades to provide a passive antenna system.

BACKGROUND

Aircraft must typically transmit and receive information during flight. However, small aircraft (e.g., unmanned aerial vehicles (UAVs)) may have restrictions on the placement of traditional antenna apparatuses due to size and/or weight concerns. These restrictions typically result in antennae on small aircraft that have low directionality and/or low gain. Coupled with severe limitations on power consumption and radiated power, as well as the need for high bandwidth video signals, operational transmit/receive ranges for UAVs are often far less than satisfactory.

SUMMARY OF PARTICULAR EMBODIMENTS

In one embodiment, a system includes an aircraft body and a propeller coupled to the aircraft body. The propeller includes a plurality of blades forming a rearward-facing curvature with respect to an axis running longitudinally with the aircraft body. The system further includes a surface coupled to a first blade of the propeller that is operable to optimally reflect radio frequency (RF) waves.

In another embodiment, a system includes an aircraft body and a propeller coupled to the aircraft body. The propeller includes a plurality of blades that are approximately perpendicular to an axis running longitudinally with the aircraft body. The system further includes a plurality of surfaces coupled to a first blade of the propeller. Each of the plurality of surfaces coupled to the first blade forms a rearward-facing curvature with respect to the axis running longitudinally with the aircraft body and is operable to optimally reflect radio frequency (RF) waves.

The present disclosure provides numerous technical advantages over typical systems. As one example, certain embodiments may provide for the transmission of data from a small aircraft in substantially a single direction over a long distance using a high-gain antenna system coupled to propeller blades. For instance, certain embodiments may provide for the transmission of a high-density, high-rate video signal (e.g., a high definition video signal) between a small aircraft and a base location far away.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

FIG. 1 illustrates an example embodiment of a high-gain antenna system utilizing surfaces coupled to blades of an aircraft propeller, in accordance with embodiments of the present disclosure.

FIG. 2 illustrates another example embodiment of a high-gain antenna system utilizing surfaces coupled to blades of an aircraft propeller, in accordance with embodiments of the present disclosure.

DESCRIPTION OF EXAMPLE EMBODIMENTS

Small aircraft, such as unmanned aerial vehicles (UAVs), typically transmit and receive data during flight. The small size of these aircraft typically limits the amount of weight and power consumption that is allowable onboard, which can severely restrict the selection of data transmission equipment. For instance, typical transceivers on small aircraft include small, omnidirectional or near-omnidirectional antennae such as half dipole antennae. While such antennae may provide wide angular coverage of the transmitted (and received) signals, they have low sensitivity and gain in any one angular direction. The poor directional gain performance of omnidirectional antennae may restrict the range and rate at which data can be transferred. Accordingly, typical omnidirectional UAV antennas may only be satisfactory for a certain low-rate data functions, such as the transmission of aircraft health status and reception of aircraft control functions.

In many situations, however, it may be desirable to transmit data from the aircraft in substantially a single and possibly steerable direction over a long distance. For example, it may be desirable to transmit a high-density, high-rate video signal (e.g., a high definition video signal) between the aircraft and a base location far away. Such a signal typically requires a transmission system that allows for higher gain and longer transmit/receive ranges, such as a larger, directional RF antenna. However, the size, weight, and aerodynamic limitations for smaller aircraft may restrict the ability to integrate larger, directional antennae onto the aircraft.

Accordingly, embodiments of the present disclosure include systems that provide high-gain antennae for transmitting high-density, high-rate signals over long distances to and from UAVs and other small aircraft and control stations. The propeller diameters of UAVs by nature span up to several wavelengths of RF radiation, which is more than adequate to significantly boost directional RF datalink sensitivity, gain, and transmission rates. Thus, aspects of the present disclosure may utilize the blades of the propeller to provide aft-facing passive antennae that have high gain, sensitivity, and directionality. This may be accomplished using surfaces that are coupled to the propeller blades. In one embodiment, the propeller blades and surfaces coupled thereto may have a rear-facing curvature (e.g., a parabolic curvature). In another embodiment, the propeller blades may be perpendicular to an axis running longitudinally with the aircraft, and the surfaces coupled to the blades may have a rear-facing curvature (e.g., a parabolic or toric curvature).

[1] To facilitate a better understanding of the present disclosure, the following examples of certain embodiments are given. In no way should the following examples be read to limit, or define, the scope of the disclosure. Embodiments of the present disclosure and its advantages may be best understood by referring to FIGS. 1-2, where like numbers are used to indicate like and corresponding parts.

FIG. 1 illustrates an example embodiment of a high-gain antenna system 100 utilizing surfaces 115 coupled to blades of an aircraft propeller 110, in accordance with embodiments of the present disclosure. The system 100 includes an aircraft body 105 with a propeller 110 coupled thereto. The propeller 110 may comprise any suitable number of blades for propelling the aircraft, such as three, four, five, or six blades. In some embodiments, the aircraft body 105 may be the fuselage of a UAV as illustrated in FIG. 1. However, it will be understood that the aircraft body 105 may be the body or fuselage of any other type of aircraft powered by a propeller. Rather than extending perpendicular to the drive shaft, as typical propeller blade may be formed, the blades of the propeller 110 may have a rearward-facing curvature. As used herein, rearward-facing curvature may refer to a curvature that is concave with respect to the rear or aft portion of the aircraft body 105. The rearward-facing curvature may be a parabolic-shaped curvature in certain embodiments.

In some embodiments, the blades of propeller 110 may each comprise one or more surfaces 115 that are operable to reflect RF waves. The surfaces 115 may be coupled to a rear-facing portion of the propeller blade, as illustrated in FIG. 1. The surfaces 115 may be composed of metal or any other suitable conductive material for reflecting RF waves, and may be coupled to the blades of propeller 110 using any suitable means. In certain embodiments, the blades may be composed metal themselves. The surfaces 115 may be coupled to any number of the propeller blades, such as one blade or all blades of the propeller. In certain embodiments, the surfaces 115 may be shaped into sections of a smooth figure-of-revolution paraboloidal reflector, with its optical axis centered on the propeller drive shaft (i.e., the axis that runs longitudinally with the aircraft body 105), or offset from the drive shaft by a necessary amount to properly focus received RF energy or collimate transmitted RF energy. Where the surfaces 115 are parabolic, the transceiver 120 may be located substantially at the focal point of the parabola formed by the surfaces 115. Where surfaces 115 form sections of a sphere of revolution, the radius of curvature of the surfaces 115 may be twice the distance of the transceiver 120, such that the amount of curvature is approximately half that of a sphere centered on the transceiver 120.

With the propeller 110 stationary, it will be understood that the blades will be curved slightly more than the required paraboloidal profile, such that when the propeller 110 is rotating at the desired speed, centrifugal forces bend the blades of propeller 110 outward into the desired curvature (e.g., parabolic shape) to collimate the RF signals sent to/from the transceiver 120.

The system further comprises a transceiver 120 coupled to the aircraft body 105. The transceiver 120 may be configured or coupled to the aircraft body 105 in such a way that it may transmit RF signals to or receive RF signals from surfaces 115 on the blades of propeller 110. The signals may be directed to a base or other location that is generally a large distance behind the aircraft body 105. For example, as illustrated in FIG. 1, RF signals 125 may be transmitted from transceiver 120 and reflected by surfaces 115 on the blades of propeller 110 such that they are RF signals 130 directed toward a base located behind the aircraft. The transceiver 120 may be any suitable RF antenna, such as a directional RF antenna (e.g., a patch or microstrip antenna) or an omni-directional RF antenna (e.g., a dipole antenna).

In particular embodiments, system 100 may include a sensor 140 operable to detect and encode a relative location of the first blade during rotation of the propeller. The sensor 140 may be coupled to a shaft 111 of the propeller 110, as illustrated. However, in other embodiments, the sensor 140 may include an optical sensor (e.g., a laser or LED) coupled to the aircraft body 105 that is configured to optically detect and encode the relative position of one or more blades of the propeller 110.

In particular embodiments, the transceiver 120 may be configured to transmit RF pulses based on the relative location of the first blade detected by the sensor 140. For example, the RF data signals transmitted by transceiver 120 may be RF pulses that are synchronized with the rotation rate of the propeller. For example, the transceiver 120 may transmit RF pulses when a position of one or more propeller blades are in locations that maximize antenna gain in a required propagation direction during the transmit (or receive) operation.

Modifications, omissions, or additions may be made to FIG. 1 without departing from the scope of the present disclosure. For example, the curvature of the blades of propeller 110 may be of any suitable curvature that is different from that illustrated to achieve the required mix of aerodynamic and RF performance. In addition, the position of transceiver 120 and/or sensor 140 may differ from that illustrated.

FIG. 2 illustrates another example embodiment of a high-gain antenna system 200 utilizing surfaces 215 coupled to blades of an aircraft propeller 210, in accordance with embodiments of the present disclosure. The system 200 includes an aircraft body 205 with a propeller 210 coupled thereto. The propeller 210 may comprise any suitable number of blades for propelling the aircraft, such as three, four, five, or six blades. In some embodiments, the aircraft body 205 may be the fuselage of a UAV as illustrated in FIG. 1. However, it will be understood that the aircraft body 205 may be the body or fuselage of any other type of aircraft powered by a propeller.

In some embodiments, the blades of propeller 210 may each comprise one or more surfaces 215 that are operable to reflect RF waves. The surfaces 215 may be coupled to a rear-facing portion of the propeller blade, as illustrated in FIG. 2. The surfaces 215 may be composed of metal or any other suitable conductive material for reflecting RF waves, and may be coupled to the blades of propeller 210 using any suitable means. As an alternative to the blades of propeller having a rearward-facing curvature as described above, the surfaces 215 may themselves have a rearward-facing curvature, wherein propeller 210 has blades that are perpendicular to the drive shaft axis running longitudinally with the aircraft body 205. The surfaces 215 may be coupled to any number of the propeller blades, such as one blade or all blades of the propeller.

In certain embodiments, the surfaces 215 may be shaped into sections of a smooth figure-of-revolution paraboloidal reflector, while maintaining required aerodynamic propulsion. Where the surfaces 215 are parabolic, a transceiver 220 may be located substantially near the focal point of the parabola formed by each of the surfaces 215. Where surfaces 215 are shaped as sections of a smooth spherical surface, the radius of curvature of the surfaces 215 may be twice the distance of the transceiver 220, such that the amount of curvature is approximately half that of a sphere centered on the transceiver 220.

The system further comprises a transceiver 220 coupled to the aircraft body 205. The transceiver 220 may be configured or coupled to the aircraft body 205 in such a way that it may transmit RF signals to or receive RF signals from surfaces 215 on the blades of propeller 210. The signals may be directed to a base or other location that is generally behind the aircraft body 205. For example, as illustrated in FIG. 2, RF signals 225 may be transmitted from transceiver 220 and reflected by surfaces 215 on the blades of propeller 210 such that they are RF signals 230 directed toward a base located behind the aircraft. The transceiver 220 may be any suitable RF antenna, such as a directional RF antenna (e.g., a patch or microstrip antenna) or an omni-directional RF antenna (e.g., a dipole antenna).

In particular embodiments, system 200 may include a sensor 240 operable to detect a relative location of the first blade during rotation of the propeller. The sensor 240 may include an optical sensor (e.g., a laser or LED) coupled to the aircraft body 205 that is configured to optically detect the relative position of one or more blades of the propeller 210, as illustrated. However, in other embodiments, sensor 240 may be a sensor coupled to a shaft of the propeller 210.

In particular embodiments, the transceiver 220 may be configured to gate RF pulses based on the relative location of the first blade detected by the sensor 240. For example, the RF data signals transmitted by transceiver 220 may be RF pulses that are synchronized with the rotation rate of the propeller. For example, the transceiver 220 may transmit RF pulses when a position of one or more propeller blades are in locations that maximize antenna gain in a desired propagation direction during the transmit (or receive) operation.

Modifications, omissions, or additions may be made to FIG. 2 without departing from the scope of the present disclosure. For example, the curvature of the surfaces 215 may be of any suitable curvature that is different from that illustrated, as long as aerodynamic propulsion functionality is preserved. In addition, the position of transceiver 220 and/or sensor 240 may differ from that illustrated.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
   an aircraft body;
   a propeller coupled to the aircraft body, the propeller comprising a plurality of blades forming a rearward-facing curvature with respect to an axis running longitudinally with the aircraft body; and
   a surface coupled to a first blade of the propeller, the surface operable to reflect radio frequency (RF) waves.

2. The system of claim 1, further comprising a transceiver coupled to the aircraft body and configured to transmit RF signals toward the RF wave-reflective surface.

3. The system of claim 2, wherein the transceiver is a directional RF antenna.

4. The system of claim 1, wherein the rearward-facing curvature is a parabolic curvature.

5. The system of claim 1, wherein the rearward-facing curvature is a spherical curvature.

6. The system of claim 1, wherein the surface is coupled to a rear-facing portion of the first blade.

7. The system of claim 1, further comprising a sensor operable to detect a relative location of the first blade during rotation of the propeller.

8. The system of claim 7, wherein the sensor is coupled to a shaft of the propeller, the sensor further operable to detect and encode a rotation angle.

9. The system of claim 7, wherein the sensor includes a laser or other optical encoding device coupled to the aircraft body.

10. The system of claim 7, further comprising a transceiver that is configured to gate transmitted RF pulses based on the detected relative location of the first blade and a desired propagation direction.

11. A system, comprising:
    an aircraft body;
    a propeller coupled to the aircraft body, the propeller comprising a plurality of blades that are approximately perpendicular to an axis running longitudinally with the aircraft body; and
    a plurality of surfaces coupled to a first blade of the propeller, wherein each of the plurality of surfaces forms a rearward-facing curvature with respect to the axis running longitudinally with the aircraft body and is operable to reflect radio frequency (RF) waves.

12. The system of claim 11, further comprising a transceiver coupled to the aircraft body and configured to transmit RF signals toward the plurality of surfaces.

13. The system of claim 12, wherein the transceiver is a directional RF antenna.

14. The system of claim 11, wherein the rearward-facing curvature is a parabolic curvature.

15. The system of claim 11, wherein the rearward-facing curvature is a spherical curvature.

16. The system of claim 11, wherein each surface of the plurality of surfaces is coupled to a rear-facing portion of the first blade.

17. The system of claim 11, further comprising a sensor operable to detect a relative location of the first blade during rotation of the propeller.

18. The system of claim 17, wherein the sensor is coupled to a shaft of the propeller, the sensor further operable to detect and encode a rotation angle.

19. The system of claim 17, wherein the sensor includes a laser or other optical encoding device coupled to the aircraft body.

20. A system, comprising:
    an unmanned aerial vehicle (UAV) body;
    a propeller coupled to the UAV body, the propeller comprising a plurality of blades;
    a surface coupled to each blade of the propeller, wherein each surface forms a parabolic curvature with respect to an axis running longitudinally with the UAV body; and
    a transceiver configured to transmit radio frequency (RF) signals toward the plurality of surfaces.

* * * * *